United States Patent [19]

Kyriakis

[11] Patent Number: 4,529,175
[45] Date of Patent: Jul. 16, 1985

[54] APPARATUS FOR ANNEALING NON-FERROUS STRIP MATERIAL

[75] Inventor: John Kyriakis, Harrow, England

[73] Assignee: Beta Instrument Company Limited, England

[21] Appl. No.: 478,238

[22] Filed: Mar. 24, 1983

Related U.S. Application Data

[63] Continuation-in-part of Ser. No. 381,570, May 24, 1982, abandoned.

[30] Foreign Application Priority Data

Mar. 18, 1982 [GB] United Kingdom ............... 8207947

[51] Int. Cl.³ .............................................. C21D 9/60
[52] U.S. Cl. .................................... 266/78; 266/104; 266/112; 219/155; 339/5 RL
[58] Field of Search ............... 219/155; 266/112, 104, 266/78, 87, 90; 339/5 RL; 226/188, 190, 192; 242/155

[56] References Cited

U.S. PATENT DOCUMENTS

| | | | |
|---|---|---|---|
| 2,993,114 | 7/1961 | Bunch et al. | 266/104 |
| 4,116,422 | 9/1978 | Vogel et al. | 266/104 |
| 4,117,295 | 9/1978 | Beach | 219/10.61 R |
| 4,118,617 | 10/1978 | Moreau | 219/10.61 R |
| 4,221,947 | 9/1980 | Bonikowski | 219/155 |

FOREIGN PATENT DOCUMENTS

| | | | |
|---|---|---|---|
| 85660 | 6/1980 | Japan | 266/104 |
| 1566611 | 5/1980 | United Kingdom | 266/104 |

Primary Examiner—L. Dewayne Rutledge
Assistant Examiner—Christopher W. Brody
Attorney, Agent, or Firm—Shapiro and Shapiro

[57] ABSTRACT

It is known to anneal non-ferrous strip material by passing the strip continuously around a pair of spaced pulleys and effecting a short circuit between the incoming and outgoing strip material to form a closed electrical loop of continuously moving strip material around the pulleys. The material in the closed moving loop is heated to anneal temperature by inserting an induction coil in the run around the pulleys so that under electrical inductive effects a current is induced in the loop thus raising its temperature. The incoming and outgoing strip material overlaps in the groove of one of the pulleys, the incoming material being fed into the loop formation at the point of overlap in a spiralling path which leads or directs the strip laterally and towards the plane of the annealing loop. Loading of the pulleys is thus made easier, arcing and sparking is avoided at overlap, and the life of the system is extended. The insulated groove is made adjustable to accommodate strip material of either rectangular of circular cross-section.

5 Claims, 5 Drawing Figures

APPARATUS FOR ANNEALING NON-FERROUS STRIP MATERIAL

The present application is a continuation-in-part application of U.S. Ser. No. 381,570, filed May 24, 1982, now abandoned.

FIELD OF THE INVENTION

The present invention relates to a method and apparatus for annealing non-ferrous strip material on a continuous basis either as part of a rolling or drawing process or as a separate completely independent rewind application.

BACKGROUND ART

The necessity to anneal material in such applications is mainly for ease of handling when the material is to be used in the manufacture of transformers windings, motor windings and the like. The annealing process also improves the electrical conductivity of the strip.

A known method for annealing non-ferrous strip material is to heat the material to anneal temperatures by electrical inductive effects. Thus the material is fed around a pair of spaced pulleys one of which has a double grooved rim made of an electrical conductive material. The incoming strip is fed to one of these grooves then around the other pulley, through an induction coil and to the other groove of the first-mentioned pulley, the strip material passing around the spaced pulleys in this mode on a continous basis to provide a continuously moving closed electrical loop.

As the stip material passes through the induction coil a current is induced in it and the flow of current raises the material to the required predetermined anneal temperature. During annealing the atoms or molecules of the material are "rearranged" rendering the material soft and pliable. Following annealing the material is quenched in order to metallurgically freeze the molecules in the soft state.

In another method the incoming and outgoing material makes contact in overlapping relationship in a single groove in one of the pulleys to complete the electrical loop. A rather complicated system of in-feed pulleys has to be employed in this procedure which leads to unsatisfactory performance especially when flat stip material is undergoing treatment.

These known methods have certain basic problems which, in addition to the above, include excessive electrical sparking or arcing between the strip material passing in the grooves and mechanical wear.

SUMMARY OF THE INVENTION

It is an object of the invention to provide novel means for guiding the incoming strip to the in-feed pulley, so simplifying and improving the prior methods of loading the annealing loop with continuous in-feed strip while reducing or eliminating the deleterious effects of arcing and sparking at the contact area in the electrical loop.

According to one aspect of the invention there is provided a method of annealing non-ferrous strip material comprising feeding the strip through an induction coil, leading the strip thereafter to pass in contact with the incoming strip to the induction coil, to form a moving closed electrical loop of strip material thereby to effect heating of the strip to anneal temperatures by electrical induction, characterised in that the in-feed material is continously fed into the loop formation at said point of contact in a spiralling path which progressively leads the strip material laterally towards the plane of said loop.

In normal circumstances the above process takes place in an annealing chamber. By feeding the strip material to the annealing loop in the spiralling path as described, it becomes much easier to load the annealing chamber with continuous in-feed strip material than before and effect at the same time more positive non-arcing contact at the critical point between incoming and outgoing strip material in the loop formation.

In another aspect of the invention there is provided apparatus for annealing non-ferrous strip material comprising a pair of spaced pulleys around which the strip material is fed, an induction coil in the run between the pulleys through which the strip passes, one of the pulleys having a groove for receiving incoming and outgoing strip material in overlapping relationship to complete a closed electrical loop of strip material around the pulleys thereby to effect heating of the strip to anneal temperature by inducement of current in the closed loop caused by the strip passing through said induction coil, characterised in the provision of guide means for feeding incoming strip material to said one pulley, at the point of overlap, in a spiralling path which leads the strip material laterally towards the plane of said closed electrical loop.

Preferably the guide means is in the form of a series of guide pulleys, the axes of which are orientated in a plane or planes at an angle to the plane of the axis of said one pulley for receiving incoming and outgoing strip material.

This has particular advantage when working with strip material of rectangular or square section in which case the guide pulleys are arranged to effect distortion or twisting of the material necessary to ensure that, at the point of overlap of the strip material in the annealing loop, opposing flat surfaces of the material are in good and positive electrical contact.

The groove in said one pulley may be adjustable in size to accommodate strip material of both rectangular and circular cross-section.

Other features and advantages of the present invention will become apparent from the following description of a preferred way of carrying out the invention.

BRIEF DESCRIPTION OF THE DRAWINGS

Embodiments of the invention will now be described by way of example with reference to the accompanying drawings wherein.

BEST MODES OF CARRYING OUT THE INVENTION

Figure 1:
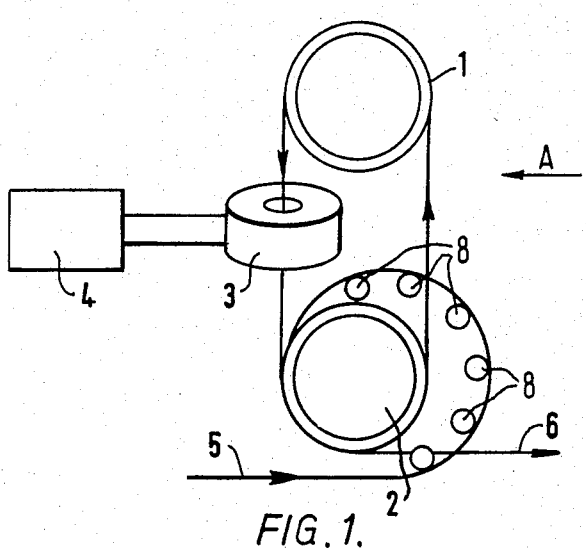
FIG. 1 is a diagrammatic view of apparatus for continuously annealing non-ferrous strip material.

The annealing apparatus shown in FIG. 1 comprises an upper pulley 1 and a lower pulley 2 spaced therefrom. An induction coil 3 is disposed in the run between the upper pulley 1 and lower pulley 2, the induction coil being connected to a variable power electrical supply 4 which is controlled by a controlling device (not shown) in such a way as to induce a correct degree of anneal as will be described hereinafter.

Non-ferrous strip material 5 to be annealed on the pulleys is fed to the lower pulley 2 and passes around the upper pulley 1, through the induction coil 3 and then emerges as outgoing strip material 6 from the lower pulley 2.

Figure 2:
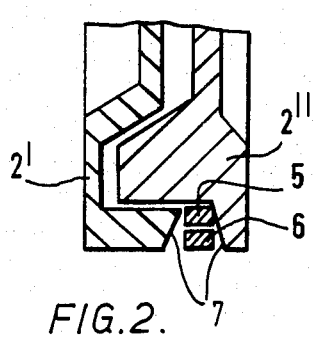
FIGS. 2 and 3 are details in cross-sectional view of the lower pulley of the apparatus of FIG. 1 which receives the incoming and outgoing strip material showing the adjustability of the size of the groove of the pulley to receive strip material both of rectangular and circular cross-section.
Figure 3:
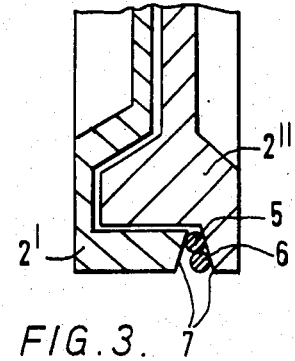

The construction of the lower pulley 2 is shown in FIGS. 2 and 3. It comprises a pair of pulley halves 2' and 2'' which are adjustably positioned relative to one another so that the groove 7 in the rim of the pulley is adjustable in size.

As will be seen from FIGS. 2 and 3 the incvoming and outgoing strip material (5,6) is in overlapping relationship in the groove 7 of the pulley 2, the overlapping relationship being such as to ensure electrical contact thereat thus forming a closed electrical loop of strip material around the pulleys 1 and 2. The adjustability of the groove 7 is provided so that the groove can accommodate the strip material both of rectangular cross-section, as shown in FIG. 2, and circular cross-section, as shown in FIG. 3.

Figure 4:
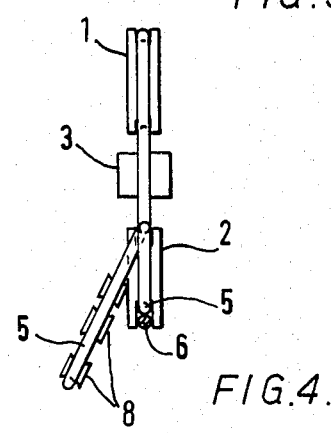
FIG. 4 is a side view of the apparatus of FIG. 1 along the direction of arrow A.

To ensure that the overlapping portions of the incoming and outgoing strip material effects the required electrical short circuit to close the loop electrically around the pulleys 1 and 2, a series of rollers 8 are arranged on the infeed side of the lower pulley 2 as shown, to cause the incoming strip material to follow a spiralling path (i.e. into the plane of the drawing of FIG. 1) to the pulley 2. As shown in FIG. 1 the rollers 8 are positioned in radially-reducing array with respect to the axis of the pulley 2 to form the spiralling path and, in the example shown, are arranged successively in a plane at an angle to the plane of the lower pulley 2 as shown in FIG. 4. In this way the paths of incoming and outgoing strip material become coplanar around the pulley 2 and in overlapping relationship thus forming a continuous short circuit and allowing the current induced in the loop to flow through the loop from the incoming to the outgoing strip material.

By guiding the incoming strip material 5 around the pulleys 8 into the in-feed pulley 2 in the described way, the material is progressively displaced laterally and towards the plane of the annealing loop to effect a much improved and simplified in-feed technique accompanied by excellent electrical contact at the overlap area. This in-feed arrangement is particularly suitable for dealing with strip material of square or rectangular section since the axes of the respective pulleys 8 can be successfully orientated in the spiralling path so producing the required distortion or twisting of the flat strip necessary to ensure face-to-face contact of the incoming and outgoing strip at the overlap on the infeed pulley 2.

The two pulley halves 2' and 2'' of the pulley 2 are made of an insulating material. This is in contrast to the prior art where the rim having a pair of parallel grooves is made of an electrically conducting material to effect the short circuit. Due to the overlapping relationship of incoming and outgoing strip material, and the fact that the rim of the pulley 2 can be made of an insulating material, arcing and the like is avoided thus making the system much more efficient and workable.

The control of power to the induction coil 2 via the variable power supply 4 is such that a constant degree of anneal is effected in the moving strip irrespective of linear speed variations. This is achieved by the control device (not shown) connected to the variable power device 4 which monitors various parameters including the linear speed of the material and the anneal temperature and loop voltage induced and makes appropriate corrections to the power supplied to the inductor 5 to ensure that the annealed temperature is maintained constant.

Figure 5:
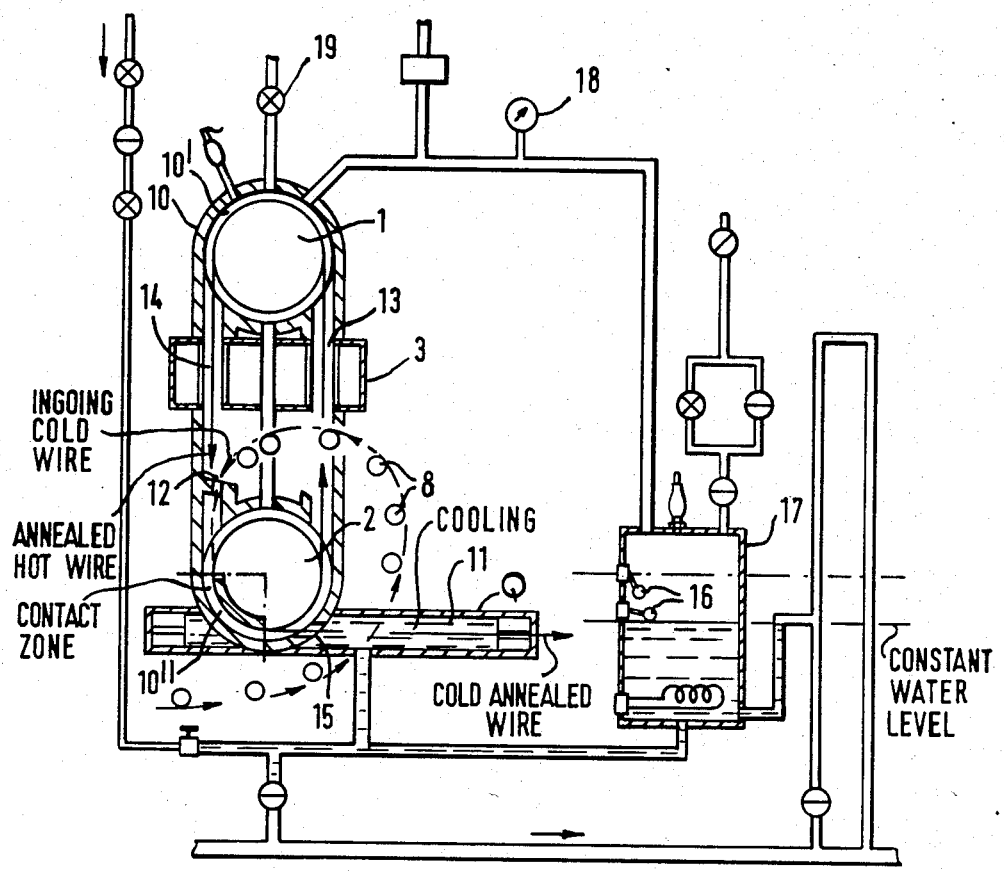
FIG. 5 is a schematic view of a combined annealing and quenching apparatus in a continuous drawing or rolling process incorporating the annealing apparatus of FIG. 1.

The annealing and quenching apparatus employing the annealing apparatus of FIGS. 1,2,3 and 4 in a continuous rolling or drawing process is shown in FIG. 5. This comprises an annealing chamber 10 having an upper part 10' housing the pulley 1 and a lower part 10'' the pulley 2.

Incoming strip material 5 is fed over the pulleys 8 through an opening 12 in the lower part 10'' of the chamber 10 to pass round the lower pulley 2. The strip is then led through the induction coil 3 at 13 to the upper pulley 1 and back over the incoming strip on pulley 2 after again passing through the coil 3 at 14. The thusly treated strip exits from the tank 10 through opening 15. The spiral arrangement of the pulleys 8 facilitates the loading of the chamber 10 and enables good contact to be effected at overlap without the need to employ a more complicated array of infeed pulleys, otherwise necessary to effect in-feed, by diverting the incoming strip out of the run of the loop with the incoming strip beneath the outgoing strip at the point of overlap. After annealing the strip material is quenched in a quenching chamber Q containing cooling fluid 11. The cooling fluid 11 is preferably water, although oil can be used, and a level control device 16 in a make-up tank 17 is incorporated to ensure that the quenching point of the quenching fluid 11 always remains constant. Thus in use the make-up tank 17 continuously supplies water to the chamber Q to maintain a constant level therein.

The quench water 11 is maintained at nearly boiling point which can be used to generate sufficient steam for use in the annealing chamber 10 to maintain a bright and clean surface of the material to be annealed.

The apparatus shown in FIG. 5 includes safety devices including a speed cut-out (not shown) which shuts off all the power to the induction coils following line stoppage. A manometer 18 is provided which measures stream pressure in the annealing chamber 10' and releases excess pressure through a relief valve 19.

Other features and advantages of the present invention will be apparent to those skilled in the art and can be incorporated in the apparatus as just described within the broad inventive concept of the invention as defined in the appended claims.

I claim:

1. Apparatus for annealing non-ferrous strip material comprising a pair of spaced pulleys around which the strip material is fed, an induction coil in the run between the pulleys through which the strip passes, one of the pulleys having a groove for receiving incoming and outgoing strip material in overlapping relationship to complete a closed electrical loop of strip material around the pulleys thereby to effect heating of the strip to anneal temperature by inducement of current in the closed loop caused by the strip passing through said induction coil, characterised in the provision of guide means for feeding incoming strip material to said one pulley, at the point of overlap, in a spiralling path which extends from outside the loop to inside the loop and which leads the strip material laterally towards the plane of said closed electrical loop.

2. Apparatus as claimed in claim 1 wherein said guide means comprises a series of rollers the axes of which are orientated successively in a plane or planes at an angle to the plane of the axis of said one pulley.

3. Apparatus as claimed in claim 2 wherein the groove of said one pulley is adjustable in size to accommodate strip material of both rectangular and circular cross-section.

4. Apparatus as claimed in claim 3 wherein said induction coil is connected to a variable power A.C. source and control means is provided for controlling the output of said A.C. source whereby to maintain a constant degree of anneal temperature in said closed loop irrespective of variations in linear speed of strip material, ambient temperature and induced loop voltage.

5. Apparatus as claimed in claim 1 wherein said pair of spaced pulleys are mounted in an annealing tank, said one pulley of said pair being mounted in a lower chamber of said annealing tank, the other pulley of said pair in an upper chamber of said tank, characterised in that the outgoing annealed strip material exits into a quenching chamber subsequent to overlapping contact on said one pulley.

* * * * *